United States Patent [19]

Russo et al.

[11] Patent Number: 5,431,810
[45] Date of Patent: Jul. 11, 1995

[54] SYSTEM FOR PURIFYING WATER CONTAINING IMMISCIBLE ORGANIC COMPOUNDS

[76] Inventors: John F. Russo, 32 Granger Ave., Reading, Mass. 01867; Martin S. Fischer, 700 Middleton Rd., North Andover, Mass. 01845; Donald A. Ventullo, 75 Green Meadow Dr., Tewksbury, Mass. 01876

[21] Appl. No.: 293,937

[22] Filed: Aug. 22, 1994

Related U.S. Application Data

[60] Division of Ser. No. 76,635, Jun. 15, 1993, abandoned, which is a continuation-in-part of Ser. No. 751,834, Aug. 30, 1991, abandoned.

[51] Int. Cl.⁶ .................................... C02F 9/00
[52] U.S. Cl. ......................... 210/104; 210/181; 210/182; 210/257.1; 210/259; 210/266; 210/284; 210/519
[58] Field of Search ............... 210/104, 105, 115, 130, 210/181, 182, 257.1, 258, 259, 266, 284, 519

[56] References Cited

U.S. PATENT DOCUMENTS

| | | | |
|---|---|---|---|
| 1,513,882 | 11/1924 | Bateman | 210/94 |
| 3,276,458 | 10/1966 | Iversen et al. | 210/900 |
| 3,532,216 | 10/1970 | Zievers et al. | 210/289 |
| 3,870,033 | 3/1975 | Faylor et al. | 210/900 |
| 4,374,028 | 2/1983 | Medina | 210/669 |
| 4,406,789 | 9/1983 | Brignon | 210/519 |
| 5,108,591 | 4/1992 | Hagan | 210/104 |

OTHER PUBLICATIONS

C. R. Hamilton, "Closed Loop Terpene-Based Cleaning Systems: Customer Installation Case Studies", International CFC and Halon Alternative Conference, Baltimore, Md. Dec. 3–5, 1991.

*Primary Examiner*—Ivars Cintins
*Attorney, Agent, or Firm*—Foley & Lardner

[57] ABSTRACT

A system is provided for the purification of waste water which has been contaminated through the cleaning of circuit boards or other parts. The system continuously recycles rinse/wash water from an aqueous or semi-aqueous cleaner, using a separation tank and a purification unit to continuously purify and deionize the contaminated water. The separation tank removes immiscible organic compounds such as terpenes from the contaminated water to produce partially-purified water. The purification unit heats, further purifies, and deionizes the water. Fresh make-up water is automatically added as needed to assure a sufficient supply of water to the cleaner. The separation tank is designed to provide effective removal of the immiscible organic compounds and to resist solvent attack by the organic compounds and corrosion by the deionized water.

8 Claims, 6 Drawing Sheets

SYSTEM FOR PURIFYING WATER CONTAINING IMMISCIBLE ORGANIC COMPOUNDS

This application is a division, of application Ser. No. 08/076,635, filed Jun. 15, 1993, which is a continuation-in-part of Ser. No. 07/751,834 filed Aug. 30, 1991, both now abandoned.

BACKGROUND OF THE INVENTION

The present invention relates to a system for purifying water containing immiscible organic compounds and, more particularly, relates to a system for removing toxic impurities and immiscible organic compounds, such as terpenes, from water after it has been used as a rinse or wash in a cleaning device.

In the production of circuit boards and other parts, it is necessary to wash thoroughly the completed circuit board or component with a cleaning solution which is capable of removing all traces of fluxes, solder pastes, and other contaminants remaining from the manufacturing process. Some cleaners employ volatile CFC's such as freon as the cleaning solvent. Although these solvents offer the advantage of not requiring a rinse or wash subsequent to cleaning because they evaporate from the surface of the circuit board, they are harmful to the atmosphere and have thus been banned in many locations. The disadvantages associated with these solvents have led to a search for more acceptable solvents.

Some of the problems associated with CFC solvents can be avoided through the use of organic solvents which are less volatile and are not harmful to the atmosphere. However, since these less volatile materials have a low evaporation rate, the product must be rinsed with water and then dried to remove the solvent from the product. Water rinsing removes the remaining solvent and rinses away the remaining residues.

While this process effectively cleans the circuit boards or parts, it produces large volumes of waste water which are contaminated with the organic solvent and the toxic substances removed by the solvent. This problem is alleviated somewhat by the fact that many of the organic solvents suitable for such purposes are substantially immiscible with water, i.e., only minimally soluble in water. These solvents thus typically form a two-phase system with water and can be removed to a large extent through physical separation. However, since these compounds are not completely immiscible and thus cannot be completely separated from water, a system employing a separation device still produces large amounts of contaminated waste water which generally contains too high a level of organic and/or toxic impurities to permit discharge into septic systems or some sewer systems without further treatment.

To avoid these problems, systems have been proposed which purify the waste water and recycle it to the cleaner. One such system includes a decanter or separation tank which separates the major part of the solvent from the water, thus partially purifying the water, and filtration and treatment devices which are designed to complete the purification process and to recycle the water back to the cleaner.

SUMMARY OF THE INVENTION

It is therefore an object of the invention to provide a system for removing immiscible organic compounds from waste water which purifies and recycles waste water in a continuous loop without requiring the discharge or storage of any waste water, which is compact, and which is easy and economical to transport and install.

In accordance with this aspect of the invention, a system is provided which comprises a separation tank which has an inlet connectable to a contaminated water outlet of a cleaner and which separates immiscible organic compounds from contaminated water. The separation tank also has an outlet for the discharge of partially-purified water. In addition, a purification unit is provided which has an inlet connected to the outlet of the separation tank and which has an outlet connectable to the inlet of the cleaner. The purification unit may be comprised of a heated storage tank and a purification/deionization system having an inlet connected to the storage tank and having an outlet connected to the outlet of the purification unit. The purification/deionization system purifies and deionizes heated water for recirculation to the cleaner.

Further in accordance with this aspect of the invention, the purification/deionization system preferably comprises a first plurality of tanks at least partially filled with activated carbon and a second plurality of tanks at least partially filled with ion exchange media. The second plurality of tanks are located in series between the first plurality of tanks and the outlet of the purification/deionization system.

Another object of the invention is to provide a device for safely and reliably separating immiscible organic compounds from water and for recycling the water in a closed loop without discharging any water.

In accordance with this aspect of the invention, an insulated tank is provided which is constructed from solvent-resistant and corrosion-resistant materials and which includes an inlet for the introduction of contaminated water, a first outlet for the discharge of immiscible organic compounds, and a second outlet for the discharge of partially-purified water. The first outlet is located above the second outlet when the organic solvent is lighter than water. It will be appreciated that the construction of the separator tank will be inverted for solvents that are heavier than water.

Also provided are a first pipe connected to the first outlet, an upper distributor, a second pipe which has an inlet connected to the inlet of the insulated tank and an outlet connected to the upper distributor, and a third pipe connected to the second outlet. A lower distributor is also provided which is connected to the third pipe. The tank is preferably constructed from stainless steel and each of the upper and lower distributors and the first, second, and third corrosion-resistant pipes are preferably constructed from at least one of stainless steel, grey PVC, and white PVC.

Still another object of the invention is to provide a process of efficiently and reliably purifying waste water in a closed loop.

In accordance with this aspect of the invention, the process comprises the steps of separating immiscible organic compounds from the water in a separation tank to produce partially-purified water, and then discharging the immiscible organic compounds and the partially-purified water from respective first and second outlets of the separation tank. A subsequent step includes purifying the partially-purified water in a purification unit which has an inlet connected to the second outlet of the separation tank and which has an outlet connectable to the pure water inlet of the cleaner. The purifying step comprises the steps of adding make-up water to the partially-purified water and heating the partially-purified water, and conveying the heated and partially-purified water through a purification/deionization system to purify and deionize the heated and partially-purified water.

BRIEF DESCRIPTION OF THE DRAWINGS

The above and further objects of the invention will become more readily apparent as the invention is more clearly understood from the detailed description to follow, reference being had to the accompanying drawings in which like reference numerals represent like parts throughout, and in which.

DETAILED DESCRIPTION OF THE PREFERRED EMBODIMENTS

Pursuant to the invention, a system is provided for the purification of waste water which has been contaminated through the cleaning of circuit boards or the like. The system continuously recycles rinse/wash water from an in-line aqueous cleaner, using a separation tank and a purification unit to continuously purify and deionize the contaminated water. The separation tank effectively removes immiscible organic compounds from the contaminated water to produce partially-purified water. The purification unit heats, further purifies, and deionizes the water. Fresh tap water is automatically added as needed to assure a sufficient supply of water to the cleaner. The separation tank, as well as all fittings and conduits of the system, are designed to withstand or at least to resist the corrosive effects of the water and the solvent attacks of the immiscible organic compounds.

Figure 1:
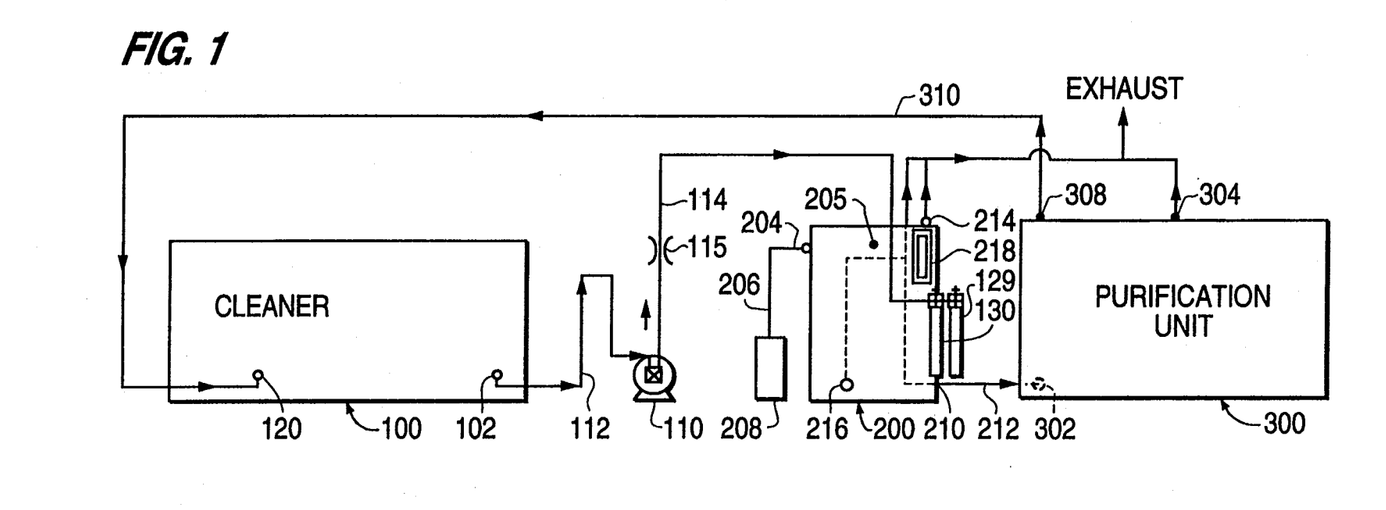
FIG. 1 is a schematic elevational view of a waste water purification system constructed in accordance with a preferred embodiment of the invention.
Figure 2:
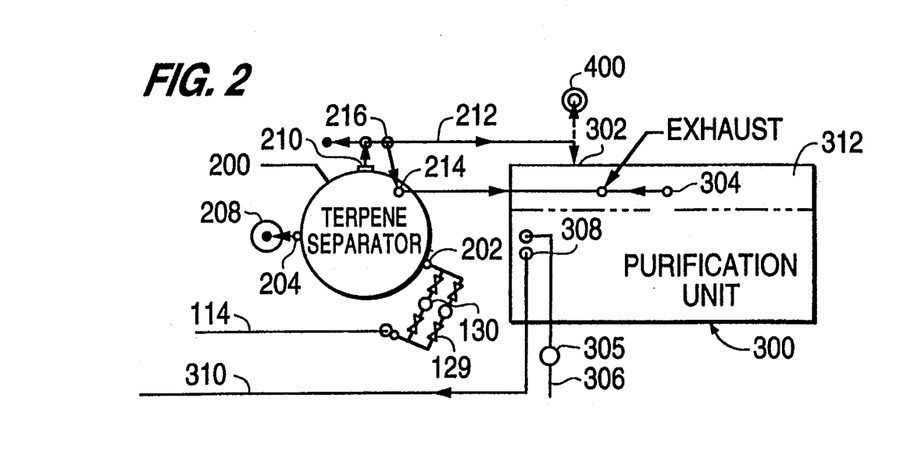
FIG. 2 is plan view of a portion of the system illustrated in FIG. 1.

Referring to FIGS. 1 and 2, the system includes a separation tank 200 and a purification unit 300 which purify waste water discharged from a conventional aqueous or semi-aqueous cleaner 100. The cleaner 100 employs any of various known immiscible organic compounds as a cleaning solvent. By way of illustration, the invention will be described in conjunction with a system using terpenes as the solvent. However, the invention is applicable to a system using any immiscible organic compound as a solvent. The construction and operation of the cleaner 100 is well known per se, and thus will not be discussed in further detail.

The contaminated solution is pumped out of an outlet 102 of the cleaner 100 and into a pair of parallel filters 129, 130 via a transfer pump 110 and conduits 112, 114. Preferably, the transfer pump 110 operates substantially continuously, drawing water out of outlet 102 at a rate which is higher than the rate at which water flows into inlet 120. This prevents flooding of the cleaner 100. Normally, the volume pumped out of the cleaner per unit time is 10–20% higher than the volume pumped in. The conduit 114 can be fitted with a flow restrictor 115 to avoid excessive flow rates into the separation tank 200 that could exceed the capacity of the tank. The filters 129 and 130 remove particulates from the waste water before it is transferred into an inlet 202 of separation tank 200.

Figure 8:
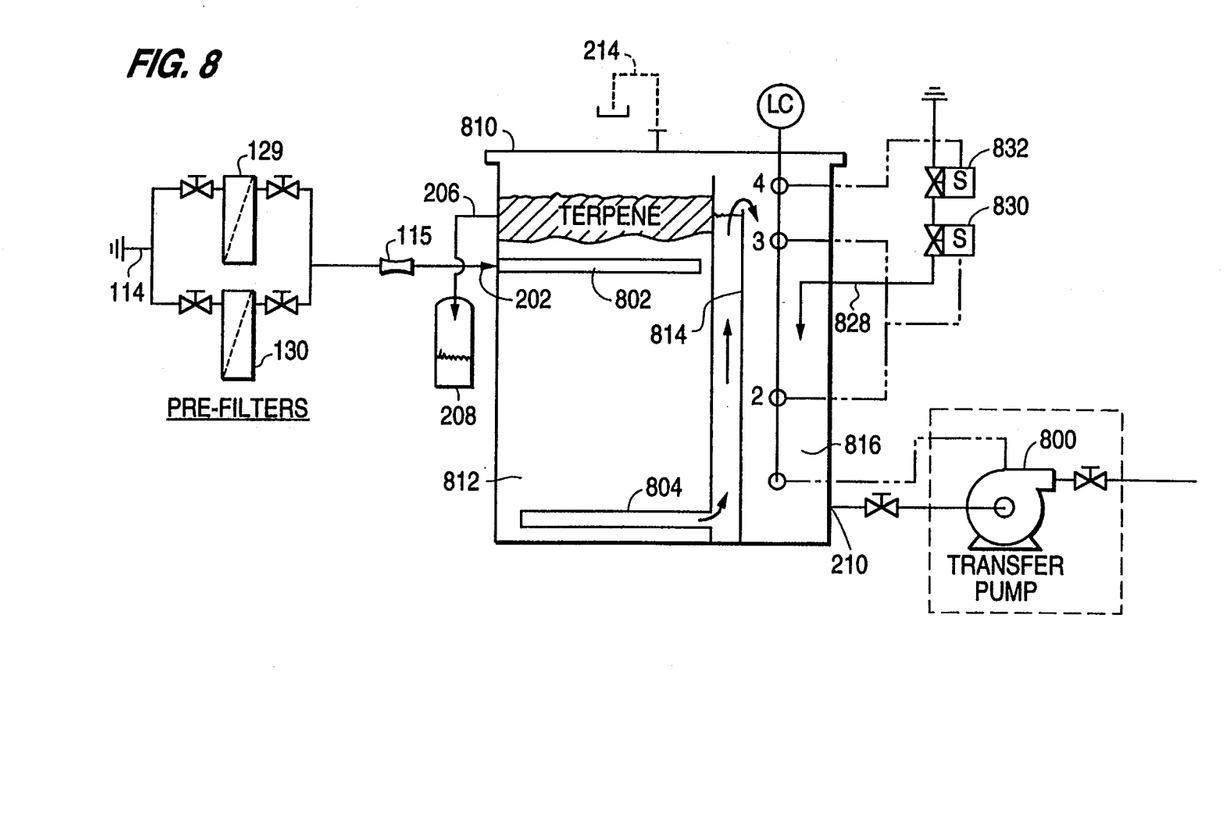
FIG. 8 is an elevational view along the centerline of a second embodiment of a separation tank.

In the separation tank 200, the terpenes are separated from the water in a manner discussed in more detail below and are discharged to an outlet waste terpene container 208 via a line 206 and an outlet 204 formed in the separation tank. An optional additional outlet 205 is provided for a second outlet waste container (not shown). The remaining, partially-purified water is transferred out of an outlet 210 of tank 200 and into an inlet 302 of the purification unit 300 via a conduit 212. The horizontal distance between the separation tank 200 and the purification unit 300 should be minimized to avoid excessive pressure losses in conduit 212. If needed, a transfer pump 800 may be inserted between the separation tank and the purification unit as shown in FIG. 8. Optionally, some or all of the partially-purified water may be discharged directly into sewer 400 if the water is sufficiently purified and if such disposal practices are permitted. Vents 214, 216, and 304 are provided for the exhaustion of air and gasses from the separation tank 200 and the purification unit 300. An optional viewport 218 is provided in the separation tank 200 for visually monitoring the liquid level in the separation tank.

After being transported to the purification unit 300, the water is heated, filtered, purified, and deionized in a manner discussed in more detail below. In addition, make-up water, e.g., tap water, is introduced into the purification unit 300 via inlet 306 to make up for water which evaporates during the cleaning process. Alternatively, the make-up water may be added to the separation tank as shown in FIG. 8. The purified, heated, and deionized water is then pumped out of an outlet 308 in purification unit 300 and through a conduit 310 to the pure water inlet 120 of cleaner 100, and the steps are repeated in a continuous process.

Figure 3:
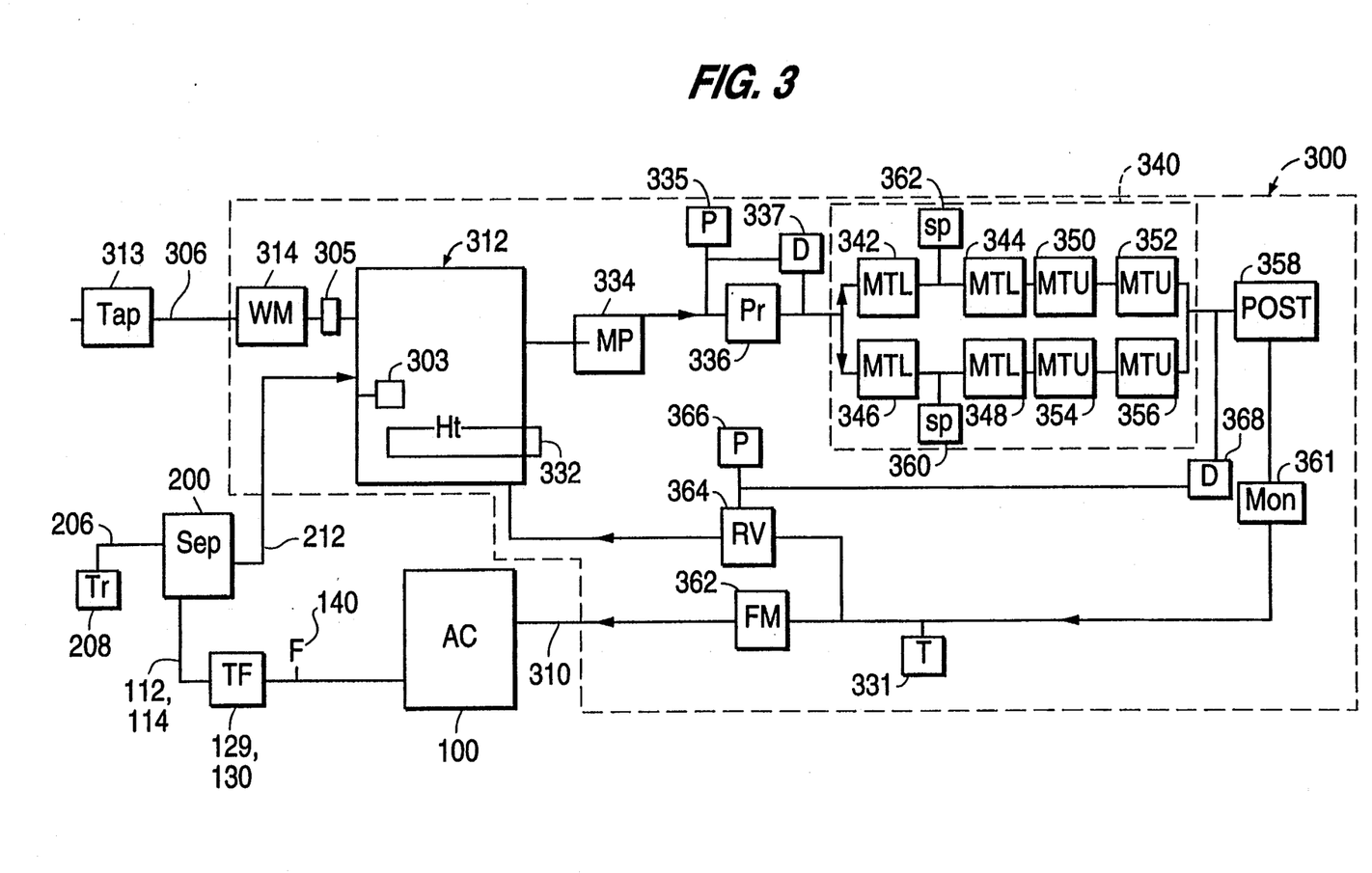
FIG. 3 is a flow chart illustrating the operation of the system of FIG. 1.

Referring to FIG. 3, the operation of the system of FIGS. 1 and 2 will be described in more detail. After being filtered and separated from the terpenes or other immiscible hydrocarbons as discussed in more detail below, the partially-purified water is pumped into a storage tank 312, where it is mixed with fresh water from a conventional source 313 which replaces water which has evaporated in the cleaning process. The make-up water may alternatively be added to the system at the separation tank, as shown in FIG. 8, or any other convenient place in the system. The storage tank is constructed out of polypropylene and is lined with a material that is solvent-resistant and corrosion-resistant, e.g., stainless steel or white PVC. The volume of tap water flowing into storage tank 312 is measured by a meter 314 and controlled by one or more switches 303 controlling valve 305 in line 306. The tap water can be introduced into the tank directly, or can be pre-filtered, softened, etc. prior to use as required by the particular application. Before it is discharged, the water in the storage tank 312 is heated by a suitable heating element 332 to a suitable temperature for application as a rinse, typically 140° F., as measured by a thermometer 331 located proximate the outlet of the purification unit 300. In the preferred embodiment, the heating element comprises a pair of immersion heaters spaced above the bottom of the tank by a relatively small distance, e.g., about 3 inches. Alternatively, other heating means, e.g., in-line heaters, could be used.

The heated water is then pumped out of the storage tank 312 by a pump 334, through a prefilter 336 where some of the remaining particulates are removed, and into a purification/deionization system 340 of unit 300, where the water is further purified and is then deionized. The pressure of the water flowing into the filter and the differential pressure across the filter may be monitored via sensors 335 and 337, respectively.

The section 340 includes a plurality of epoxy-lined stainless steel media tanks ("MTL"'s) 342, 344, 346, and 348 containing activated carbon and a plurality of unlined media tanks ("MTU"'s) 350, 352, 354, and 356 containing ion exchange media. It is possible to use other corrosion-resistant and solvent-resistant materials for the carbon-containing tanks. It is preferable to design the tanks to facilitate replacement of the media and to avoid the need to remove the outlet pipe. The activated carbon, which can be any commercially available carbon, absorbs most of the remaining impurities present in the water, including the remaining terpenes. The ion-exchange media deionizes the water upon contact. In the preferred embodiment, the media in each tank comprise resins forming a mixed bed consisting of 40% strong acid media forming the cation and 60% strong base media forming the anion. However, any combination of resins from 100% cation to 100% anion could be used, depending on the requirements of a particular application. Also other types of resins, such as macroreticular resins or chelating resins, can be used in combination with any other suitable ion exchange resins. In addition, the same tanks could hold both activated carbon and deionizing resins. While the illustrated embodiment employs two purification/deionization lines each containing two carbon-containing media tanks and two resin-containing media tanks, lines could be added or removed, and more or less of each type of tank could be employed in each line as required by a particular application.

Thus, as the partially-purified water flows through purification/deionization system 340, contaminants are first removed via the activated carbon in the lined media tanks 342, 344, 346, 348, and the water is then deionized in the unlined tanks 350, 352,354,356. If desired, the terpene content of water travelling through section 340 can be monitored at sampling points 360, 362 to ensure that the capacity of the first carbon tank 342, 344 has not been exhausted. After being purified and deionized, the divided stream of heated and purified water is then reunited and filtered in a post filter 358, which removes any particulates remaining in the water. A water quality monitor 361, located downstream of the post filter 358, assures that the water is sufficiently purified to be recycled back to the cleaner 100.

After leaving post filter 358, the purified water is recycled back into the cleaner 100 at a rate which is monitored by a flow meter 362 and controlled by the operation of a relief valve 364, which automatically maintains the pressure to cleaner 100 within the limits of the system pump. The pressure of the purified water can also be monitored by a pressure switch 366. Thus, the system assures the supply of an optimum pressure of rinse water to cleaner 100.

The construction and operation of a first embodiment of the separation tank 200 will now be described in more detail with reference to FIGS. 4–7. Although the separation tank is suitable for the separation of any immiscible organic compounds from water, the following discussion will be limited to terpenes since terpenes are a preferred solvent in semi-aqueous cleaning systems for circuit boards. The separation tank is preferably cylindrical in shape and must be sufficiently high to accommodate upper and lower distributors 230, 250 and to assure separation of terpenes from water. The tank must also be constructed of a material which can withstand the solvent attack of terpenes and the corrosive effects of deionized water for a prolonged period. In the preferred embodiment, the tank is constructed from a layer 220 of stainless steel which is surrounded by a layer 222 of thermal insulation. Advantageously, an outer plastic covering 223, preferably constructed of white PVC, is used to retain and protect the insulation 222, to resist abrasion, and to improve the appearance of the tank 200. A pipe 224 is provided for conveying the waste water into the tank, and upper and lower distributors 230 and 250 are provided to evenly distribute waste water into the tank without agitation and to withdraw partially-purified water from a large area of the tank, respectively.

Figure 4:
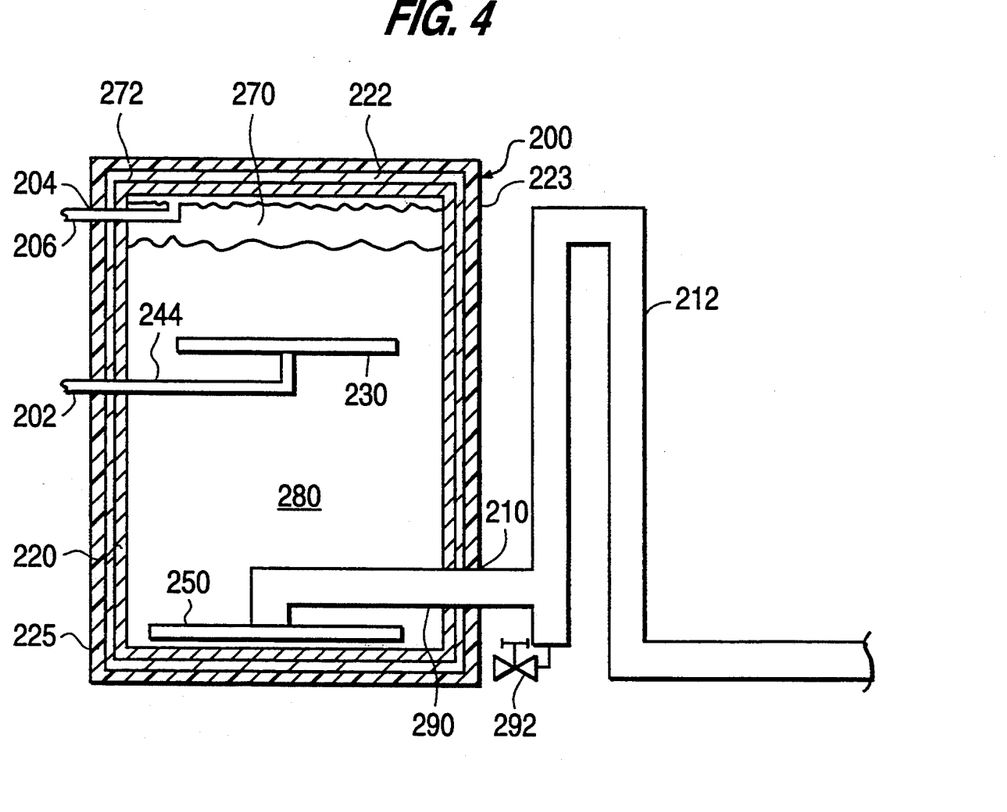
FIG. 4 is a sectional elevational view of a first embodiment of a separation tank usable in the system of FIGS. 1 and 2.

Terpenes are relatively light and thus rise to the upper portion 270 of the tank, with the partially-purified water remaining in the lower portion 280. Moreover, since terpenes are substantially immiscible, only relatively small amounts of terpenes will remain in the lower portions of the tank. The separated terpenes which have risen to the top of the tank are removed via a drain pipe 272. A pipe 290 is connected to the lower distributer 250 and conveys the partially-purified water out of the outlet 210, formed in the lower portion of the tank, and into the pipe 212 leading to the purification unit 300. A drain 292 is provided near the inlet of pipe 212 to allow for emergency draining of the pipe. The height of pipe 212 is set to maintain the desired interface level within the separation tank 200 between the water and the terpenes. This assures that water in the tank 200 will maintain a level between the upper distributor 230 and the terpene outlet 204 and that the separation line between the terpenes and the water can be viewed through viewport 218. All of the vents illustrated in FIGS. 1 and 2, though present, have been omitted for the sake of convenience. If an immiscible hydrocarbon which is heavier than water is used in place of terpenes, the various components of the tank will be reversed, with the separated organic compound being removed from the bottom of the tank and the partially-purified water being removed from the top of the tank.

It is imperative that all internal components of the tank 200 be capable of withstanding or at least resisting solvent attack from terpenes and the corrosive effects of deionized water. One option is to construct all pipes 224, 272, and 290, and all components of the upper and lower distributors 230 and 250 out of stainless steel. However, since stainless steel is relatively expensive and is very heavy, and thus requires the provision of additional supports, it is desirable to replace at least some of the internal components of the tank with lighter, less expensive components, such as those made of plastics.

Experiments with various materials have determined that several plastics simply are not suitable for use in a terpene tank. For example, polypropylene is subject to severe distortion and breakage under contact with terpenes, and CPVC dissolves. However, it has been found that ordinary PVC piping, particularly white PVC, is remarkably resistant to the effects of terpenes. In fact, it has been found that white PVC suffers no discernable ill effects even after prolonged contact with terpenes.

Grey PVC, while more widely available than white PVC, is somewhat less resistant than white PVC since it softens under prolonged contact with terpenes. However, it is still more resistant than other plastics and is suitable for use for internal components of tank 200, such as connections of pipe 290, where terpene levels are lower and where failure of the components would not lead to contamination of outside areas. In this case, stainless steel can be used for smaller elements such as lines 272 and 224 and for the supporting elements of distributors 230 and 250, and white PVC can be used for the pipe 212 and the remainder of the distributors 230 and 250. In addition, if cost and weight considerations are of secondary importance and safety of primary importance, stainless steel, and preferably 316 ss, can be used for all pipes and other components which may contact terpenes.

Figure 5:
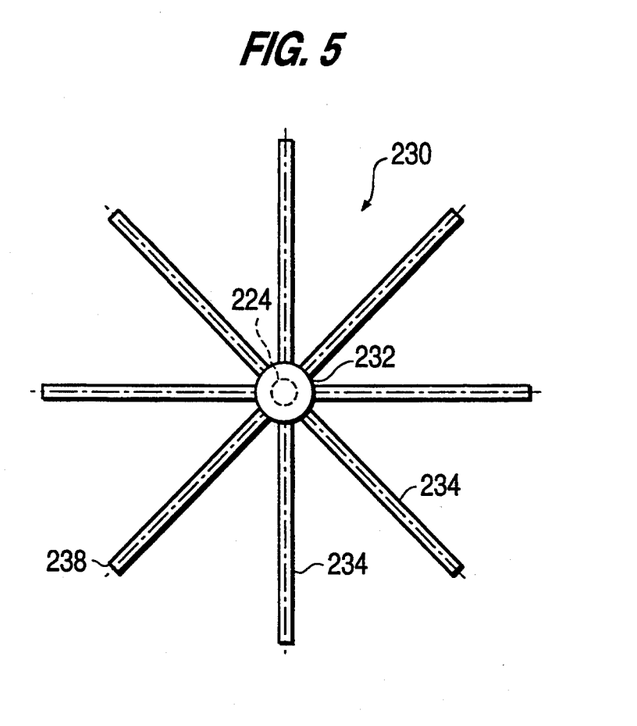
FIG. 5 is a plan view of an upper distributer assembly usable in the separation tank of FIG. 4.
Figure 6:
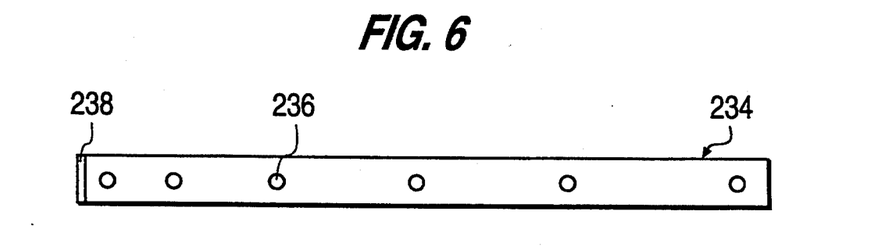
FIG. 6 is an elevational view of a tube of the distributor assembly of FIG. 5.
Figure 7:
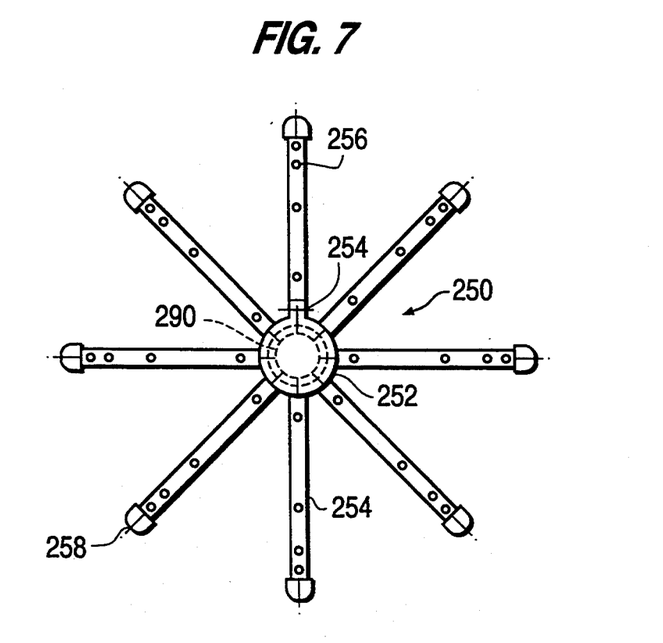
FIG. 7 is a bottom view of a lower distributer assembly usable in the separation tank of FIG. 4.

Each of the distributors 230 and 250 is designed to provide uniform distribution of fluid flow in the tank, with minimum agitation, to maximize the time during which the contaminated water resides in the tank 200. To this end, the upper distributer 230 includes a cylindrical hub 232 connected at its bottom end to the pipe 224, which delivers waste water to the distributor 230. A plurality of hollow tubes 234 extend radially outwardly from the hub 232 and are evenly spaced around the circumference of the tank. Each tube 234 is constructed of stainless steel and has holes 236 formed in pairs on opposed side surfaces of the tubes. The distance from each pair of holes to the center of the tank is set such that the annular areas associated with each pair of holes are substantially equal to one another. Thus, the radial distance between adjacent pairs decreases with distance from the center of the tank. The holes are horizontal to prevent "jets" or streams of fluid from channelling or flowing directly down from the upper distributor to the lower distributor.

In operation, waste water is delivered into the distributer 230 via pipe 224 and flows upward and outward through the hollow radial tubes and through the holes 236 so that it is distributed evenly into the entire radial cross-section of the tank 200 without undue agitation. Flow of water out of the ends of the tubes 232 is prevented by the provision of stainless steel end caps 238. With the fluid thus evenly distributed in the container, the water slowly settles down towards the lower distributor 250, and the terpenes rise to the top of the tank.

Referring to FIG. 7, the lower distributer 250 includes a cylindrical hub 252 connected at its upper end to the pipe 290, which draws the partially-purified waste water out of the distributer 250 and conveys it out of the separation tank 200. A plurality of hollow tubes 254 extend radially outwardly from the hub 252 and are evenly spaced around the circumference of the tank. Each tube 254 is constructed of stainless steel and has holes 256 formed in its lower surface radially even with the holes 236 of the upper distributor 230. Pressure build-up in the tank is prevented by providing holes in the lower distributor that are larger than those present in the upper distributor.

In operation, partially-purified water is drawn into the holes 256 from the tank 200, through the tubes 254 and hub 252, and out of the tank 200 via pipes 290, 212. End caps 258, constructed of white PVC or stainless steel, assure that water must flow into the tubes 254 via holes 256. By drawing the partially-purified water through the bottom of the distributor, the lower distributer further prevents channelling by preventing the direct flow of fluid from the outlet holes of the upper distributor to the inlet holes of the lower distributor.

The construction and operation of a second embodiment of the separation tank 810 will now be described in more detail with reference to FIGS. 8-11. Like reference numerals refer to the same components as described in accordance with the first embodiment. Although the separation tank is suitable for the separation of any immiscible organic compounds from water, the following discussion will be limited to terpenes because terpenes are a preferred solvent in semi-aqueous cleaning systems for circuit boards.

The separation tank is preferably cylindrical in shape and must be sufficiently high to accommodate upper and lower distributors 802, 804 and to assure separation of terpenes from water. The separation tank 810 includes a separating chamber 812, a weir 814 for controlling the depth of the contaminated water in the separating chamber, and a transfer section 816 for holding the partially-purified water. The transfer section 816 receives the fluid overflow from the weir 814. The weir 814 receives partially-purified water from the second distributor 804.

The materials of construction of the separator tank 810 are essentially the same as those of the separator tank 200. In addition, the separation chamber 812 of the separation tank 810 operates on the same principle as that of the separation tank 200. The separation tank 810 is usable in the system of FIGS. 1 and 2 or in other systems.

One difference between the separation tank 810 and the separation tank 200 is that the separation tank 810 uses a weir 814 to control the depth of the contaminated water in the separating chamber 812, while the separation tank 200 uses an external U-shaped pipe 212 to fulfill that function. The height of the weir 814 is adjusted so that the water level in the separating chamber 812 will be sufficient for the lighter terpenes to be removed via the outlet 206.

Another difference between the separation tank 200 and the separation tank 810 lies in the construction of the distributors. In the separation tank 810, the distributors 802 and 804 are simplified in design in order to reduce cost while maintaining uniform distribution of fluid flow in the tank with a minimum of agitation so that the settling process in the separating chamber 812 is optimized.

Figure 9:
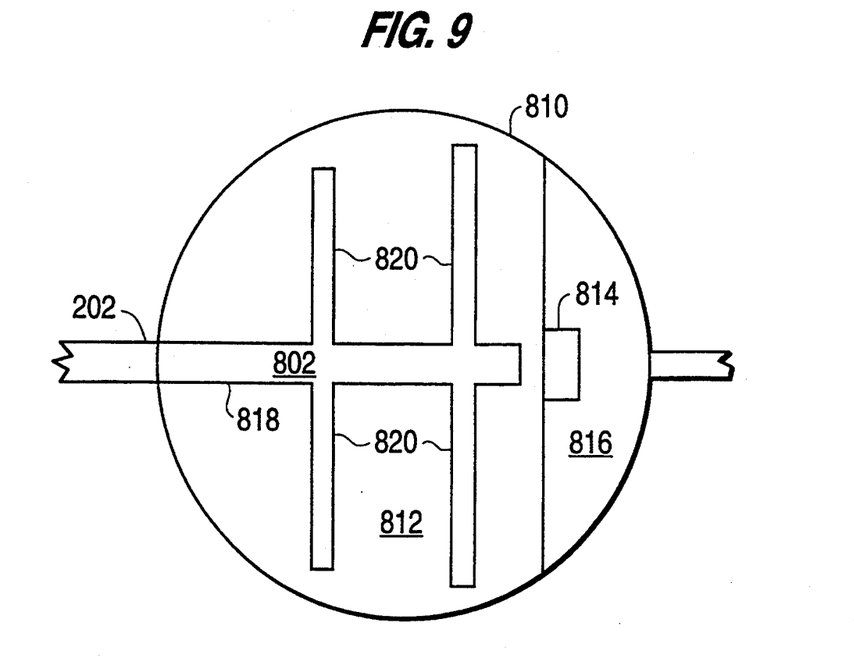
FIG. 9 is a plan view of the separation tank and upper distributor of the embodiment of FIG. 8.

FIG. 9 shows a plan view of the separation tank 810 and the upper distributor 802. The upper distributor 802 includes a central feed pipe 818 connected to the inlet 202 and a plurality of tubes 820 extending at substantially right angles from opposite sides of the central feed pipe 818. A plurality of holes 822 (see FIG. 11) are formed on opposed sides of each of the tubes 820. The tubes and the holes are arranged to lie in a plane substantially parallel to a bottom surface of the tank 810.

Figure 10:
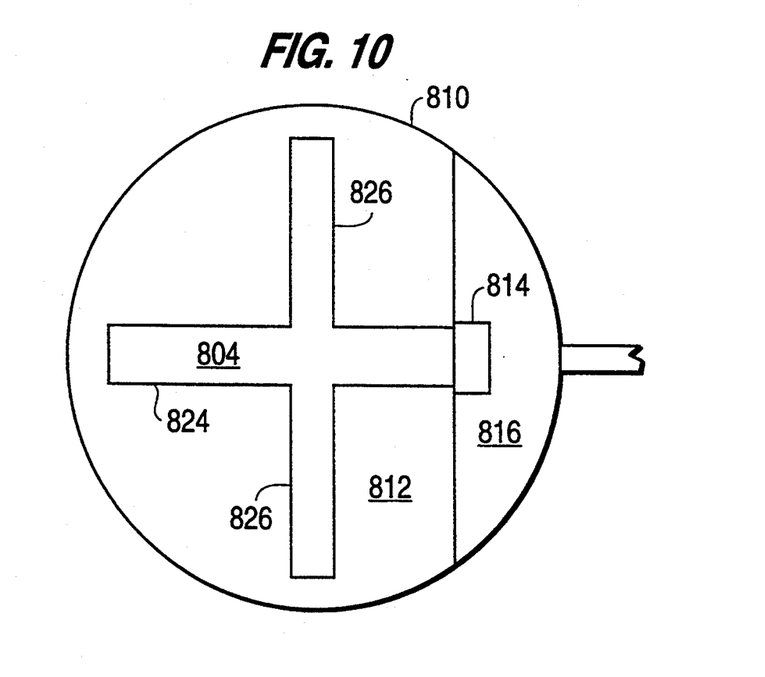
FIG. 10 is a plan view of the separation tank and lower distributor of the embodiment of FIG. 8.
Figure 11:
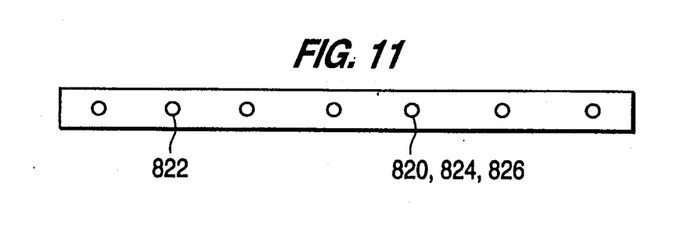
FIG. 11 is a side view showing an example of the holes in the upper and lower distributors of the embodiment of FIG. 8.

FIG. 10 is a plan view of the separation tank 810 and lower distributor 804. The lower distributor includes a central tube 824. The lower distributor 804 is connected by way of the central tube 824 to a bottom portion of the weir 814. The lower distributor 804 includes a plurality of side tubes 826 extending at substantially right angles from opposite sides of the central tube 824. A plurality of holes 822 (see FIG. 11) are formed on opposed sides of the central and side tubes 824, 826. The central tube 824, side tubes 826, and holes 822 lie in a plane substantially parallel to a bottom surface of the separation tank 810.

As shown in FIG. 8, the separation tank 810 may advantageously include a make-up water inlet 828 connected to the transfer section 816 of the separation tank 810. To control the level of make-up water in the transfer section 816, it is also advantageous to provide three level switches for controlling the level of the partially-purified water in the transfer section 816. The three level switches include a low level switch 2 for opening a make-up water valve 830 when the level falls below the low level switch 2, a high level switch 3 for closing the valve 830 when the level rises above the high level switch 3, and an emergency shut-off switch 4 for closing a second make-up water valve 832 when the level rises above the emergency shut-off switch 4. The emergency shut-off switch 4 may also function to simultaneously stop the transfer pump 110 (FIG. 1) which supplies contaminated water to the separation tank. In this way, the separation tank will not be overfilled by either make-up water or contaminated water.

In some separation devices, it is desirable that the partially-purified water leaving the separation tank be delivered under pressure to the purification unit. Alternatively, it may be necessary to boost the pressure of the partially-purified water being supplied to the purification unit because of the distance between the separation tank and the purification unit. To accomplish these purposes, a transfer pump 800 is optionally provided. The transfer pump 800 is connected to the outlet 210 of the separation tank 810. In connection with the transfer pump 800, it is convenient to include a level switch 1 for shutting off the transfer pump 800 when a level of the partially purified water in the transfer section 816 falls below the level switch 1.

While specific embodiments of the invention have been described and illustrated, it will be clear that variations in the details of the embodiments specifically illustrated and described may be made without departing from the true spirit and scope of the invention as defined in the appended claims.

For example, relief valves, level switch-actuated solenoid valves, and flow restrictors could be placed in the lines connecting the cleaner 100, the separation tank 200, 810, and the purification unit 300 to one another as desired or as required by particular applications. Pressure gauges, flow gauges, and sample points could also be added at any desired points in the system to monitor its performance. Any such devices which are in contact with contaminated or partially-purified water should be constructed from corrosion-resistant materials such as stainless steel, glass, etc. Moreover, the separation tank and the purification unit need not be provided as discrete units, but could be combined in one integral unit.

In addition, while the invention has been illustrated with a system for separating terpene solvents from water, any suitable immiscible organic compound can be separated from water in an analogous manner in light of the foregoing description.

What is claimed is:

1. A system for removing immiscible organic compounds from contaminated water used as a rinse in a cleaner having a pure water inlet and a contaminated water outlet, comprising:
   (A) a separation tank which separates at least a portion of said immiscible organic compounds from said contaminated water, said separation tank comprising:
   (i) an inlet connected to said contaminated water outlet;
   (ii) a separating chamber;
   (iii) a weir for controlling a depth of said contaminated water in said separating chamber;
   (iv) a transfer section for holding partially-purified water and communicating with an overflow of said weir;
   (v) a first outlet for the discharge from said transfer section of said partially-purified water;
   (vi) a second outlet for the discharge of said immiscible organic compounds;
   (vii) an upper distributor including a central feed pipe connected to said inlet of said separation tank and a plurality of tubes extending at substantially right angles from said central feed pipe, and wherein a plurality of holes are formed on the sides of each of said tubes; wherein said tubes and said holes lie in a plane substantially parallel to a bottom surface of said tank; whereby contaminated water is introduced into said tank with a minimum of agitation and substantially without channelling;
   (viii) a lower distributor including a central tube connected to a bottom portion of said weir and a plurality of side tubes extending at substantially right angles from said central tube, and wherein a plurality of holes are formed on the sides of said side tubes; wherein said central tube, said side tubes, and said holes lie in a plane substantially parallel to a bottom surface of said tank; and wherein said lower distributor communicates with said weir;
   (ix) a make-up water inlet connected to said transfer section of said tank; and
   (x) three level switches for controlling a level of the partially-purified water in said transfer section, the three level switches including a low level switch for opening a make-up water valve when said level falls below said low level switch, a high level switch for closing said valve when said level rises above said high level switch, and an emergency shut-off switch for closing a second make-up water valve when said level rises above said emergency shut-off switch; and
   (B) a purification unit which has an inlet connected to said first outlet of said separation tank and which has an outlet connectable to said pure water inlet of said cleaner, said purification unit comprising a heated storage tank and a purification/deionization system having an inlet connected to said storage tank and having an outlet connected to said outlet of said purification unit; wherein said purification/deionization system comprises a first plurality of tanks at least partially filled with activated carbon and a second plurality of tanks at least partially filled with ion exchange media, said purification/deionization system purifying and deionizing heated water for recirculation to said cleaner.

2. A system according to claim 1, further comprising a filter having an inlet which is connectable to said contaminated water outlet and having an outlet.

3. A system according to claim 1, further comprising a waste tank connected to said separation tank.

4. A system according to claim 1, wherein said separation tank is an insulated separation tank which is constructed from a solvent,resistant and corrosion-resistant material.

5. A system according to claim 1, wherein said purification unit further comprises a pump having an inlet connected to said outlet of said storage tank and having an outlet.

6. A system according to claim 5, wherein said purification unit further comprises a prefilter having an inlet connected to said outlet of said pump and having an outlet.

7. A system according to claim 1, wherein said purification unit further comprises a post filter having an inlet connected to said outlet of said purification/deionization system and having an outlet.

8. A system according to claim 7, wherein said purification unit further comprises a pressure relief valve having an inlet connected to said outlet of said post filter, a first outlet connected to said storage tank, and a second outlet connected to said outlet of said purification unit.

* * * * *